United States Patent
Kim

(10) Patent No.: US 7,455,267 B2
(45) Date of Patent: Nov. 25, 2008

(54) DISPLAY APPARATUS

(75) Inventor: Sung Hwan Kim, Goomi-si (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 11/702,178

(22) Filed: Feb. 5, 2007

(65) Prior Publication Data

US 2007/0290102 A1 Dec. 20, 2007

(30) Foreign Application Priority Data

Jun. 20, 2006 (KR) ...................... 10-2006-0055502

(51) Int. Cl.
*C03B 29/00* (2006.01)

(52) U.S. Cl. .......................... 248/65; 248/917; 248/918; 361/681; 361/682; 312/7.2

(58) Field of Classification Search .................... 248/65, 248/685, 686, 456, 51, 52, 316.7, 308, 918, 248/917; 361/681, 552, 682; 345/905; 174/779, 174/80, 58, 63, 65 R; 24/115 K, 528; 312/7.2, 312/223.2, 244

See application file for complete search history.

(56) References Cited

U.S. PATENT DOCUMENTS

| | | | | |
|---|---|---|---|---|
| 5,018,052 A | * | 5/1991 | Ammon et al. | 361/827 |
| 5,142,442 A | * | 8/1992 | Daniels et al. | 361/687 |
| 5,228,319 A | * | 7/1993 | Holley et al. | 70/58 |
| 5,816,081 A | * | 10/1998 | Johnston | 70/58 |
| 6,233,791 B1 | * | 5/2001 | Theis | 24/135 R |
| 6,816,364 B2 | * | 11/2004 | Helot et al. | 361/681 |
| 7,088,577 B2 | * | 8/2006 | Lauffer et al. | 361/683 |
| 2005/0141180 A1 | * | 6/2005 | Umeda et al. | 361/681 |
| 2006/0124804 A1 | * | 6/2006 | Lin | 248/65 |

FOREIGN PATENT DOCUMENTS

| | | | | |
|---|---|---|---|---|
| JP | 2000347580 A | * | 12/2000 | |
| JP | 2005159218 A | * | 6/2005 | |

* cited by examiner

*Primary Examiner*—Kimberly Wood
(74) *Attorney, Agent, or Firm*—Birch, Stewart, Kolasch & Birch, LLP

(57) ABSTRACT

A display apparatus is provided. The display apparatus includes a stand body arranging cables connected to a main body and reducing costs and time in manufacturing the display apparatus. The display apparatus includes a stand base, the stand body, the main body, and a cable holder. The stand body is supported by the stand base. The main body displaying images is supported by the stand body. The cable holder collecting cables is connected to the main body, the cable holder being attachable to a mounting portion of the stand body and detachable from the mounting portion of the stand body.

8 Claims, 3 Drawing Sheets

DISPLAY APPARATUS

BACKGROUND OF THE INVENTION

1. Field of the Invention

The present invention relates to a display apparatus including a cable holder collecting various cables connected to a main body of the display apparatus.

2. Description of the Related Art

In order to put a main body of a display apparatus such as an LCD monitor on desks or tables, a stand is required to support the main body of the display apparatus. A conventional display apparatus will now be described with reference to FIG. 1.

Referring to FIG. 1, the conventional display apparatus includes a stand base 1 placed on a desk, a main body 3 outputting various images, and a stand body 5 supported by the stand base 1 and supporting the main body 3. A cable holder 7 is mounted on the stand body 5 to collect cables. The cables are connected from the body 3 to a computer body (not shown) or an electric outlet (not shown).

The cable holder 7 includes a hinge coupling portion 7b rotatably coupled to the stand body 5 and a hook portion 7a hooked to the stand body 5. After placing cables (C) between the stand body 5 and the cable holder 7, the hook portion 7a of the cable holder 7 is hooked to the stand body 5 to clearly arrange the cables (C).

However, a hinge should be additionally provided to the stand body 5 in order to attach the cable holder 7 to the above-described stand body 5. Therefore, it costs more and takes more time to manufacture the display apparatus.

SUMMARY OF THE INVENTION

Accordingly, the present invention is directed to a display apparatus that substantially obviates one or more problems due to limitations and disadvantages of the related art.

An object of the present invention is to provide a display apparatus including a stand body. The stand body arranges cables connected to a main body and reduces costs and time in manufacturing the display apparatus.

Another object of the present invention is to provide a display apparatus including a stand body. The stand body quickly and conveniently arranges cables.

A further object of the present invention is to provide a display apparatus including a stand body. The stand body minimizes exposure of cables.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a display apparatus including: a stand base, a stand body supported by the stand base, a main body displaying images supported by the stand body, and a cable holder collecting cables connected to the main body, the cable holder being attachable to a mounting portion of the stand body and detachable from the mounting portion of the stand body.

Both ends of the cable holder may include protrusions, and the mounting portion of the stand base may include recesses or holes, or both ends of the cable holder may include recesses or holes and the mounting portion of the stand base may include protrusions.

The mounting portion may be formed in a rear and upper portion of the stand body.

At least one of the cable holder and the mounting portion elastic deforms when the cable holder is attached to the mounting portion or detached from the mounting portion.

The stand body includes a receiving portion facing the cable holder and receiving the cables.

The stand body and the cable holder may define an upper and rear holes through which the cables go.

The cable holder and the stand body may be formed by a plastic injection molding.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
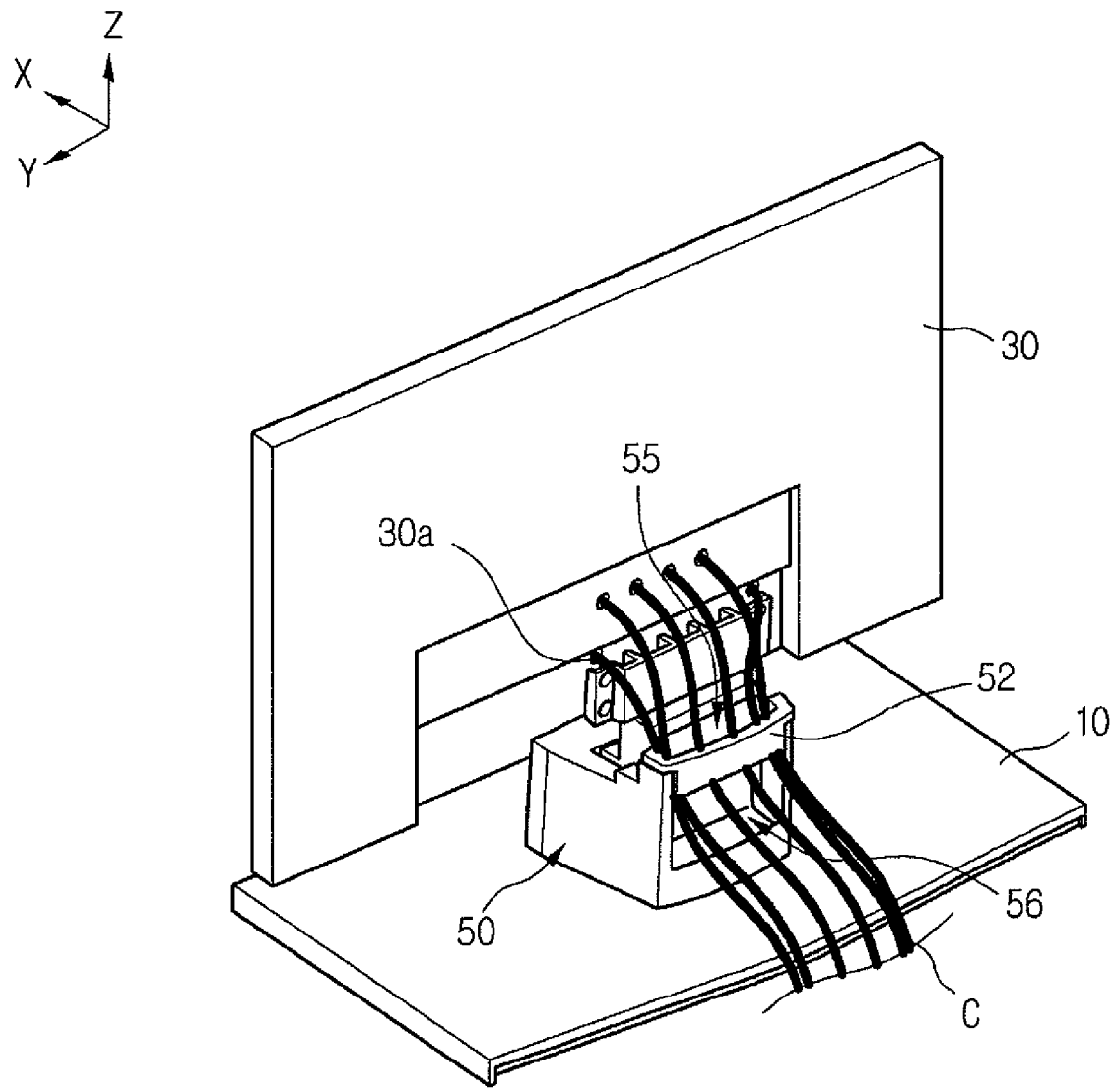
FIG. 3 is a rear perspective view illustrating a cable arrangement by a stand body of a display apparatus according to an embodiment of the present invention.

A main body 30 of a display apparatus is supported by a stand body 50 and can display images forward (X-axis direction) It is the display device such as a liquid crystal display (LCD), a plasma display panel (PDP), and an organic light emitting diode (OLED) to display the images. The display device is included in the main body 30. In addition, in the main body 30, a circuit board is included to drive the display device. Ends of various cables (C) are connected to the circuit board through a connection jack 30a illustrated in FIG. 3. The cables (C) supplies power and transfers signals. The other ends of the cables (C) are connected to an electric outlet or other electronic devices (e.g. computer main body).

A stand base 10 is a flat plate type to be stably placed on a desk and the like. A bottom surface of the stand base 10 is a flat plate type to contact an upper surface of the desk and the like. Designs are considered and an upper surface of the stand base 10 may be manufactured using a variety of patterns, shapes and colors.

The stand body 50 is supported by the stand base 10. The stand body 50 may be fixed in the stand base 10 or supported to swivel around z-axis. In addition, the stand body 50 supports the main body 30 and may be configured to adjust a height and an angle of the main body 30.

Figure 1:
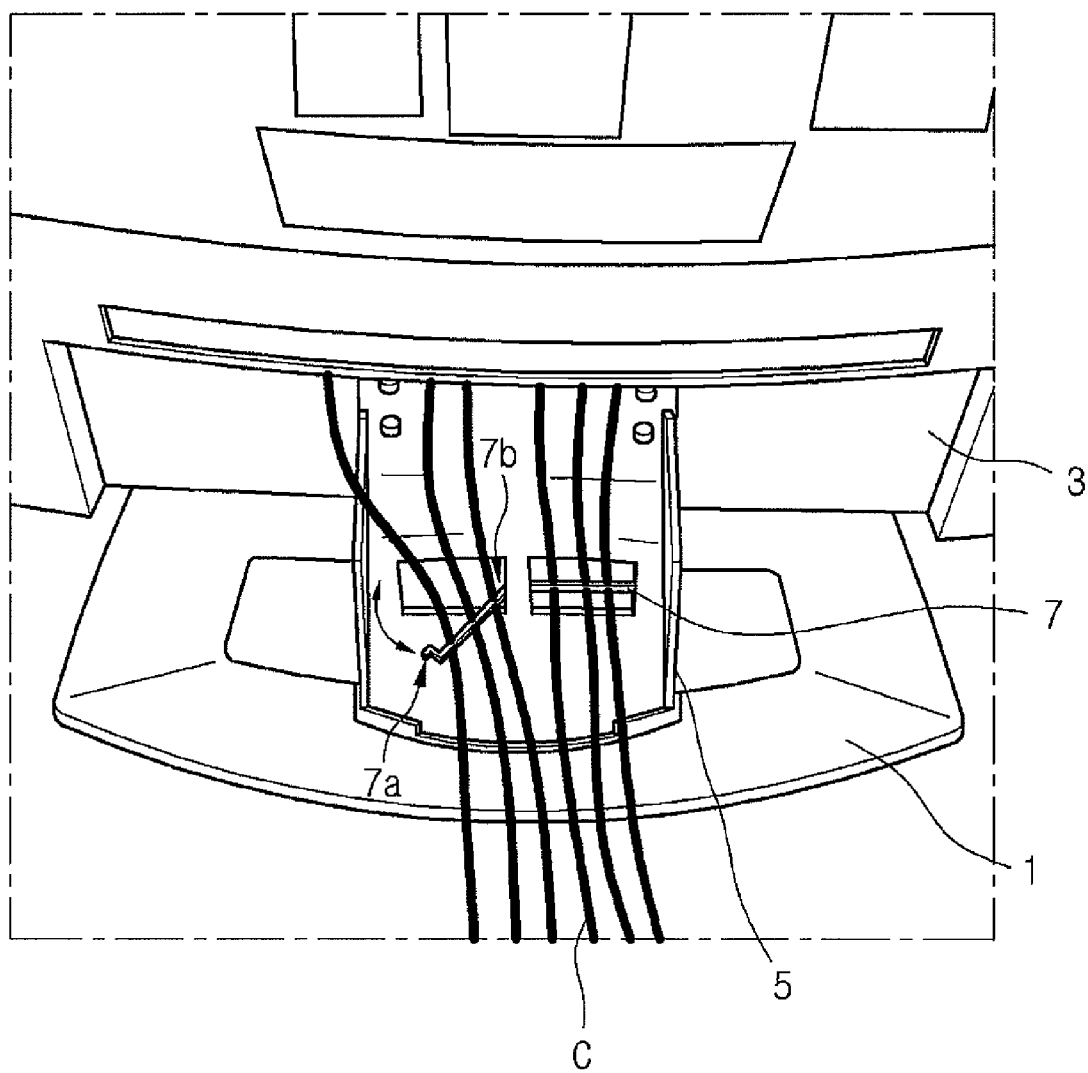
FIG. 1 is a rear perspective view illustrating a display apparatus including a conventional cable holder.
Figure 2:
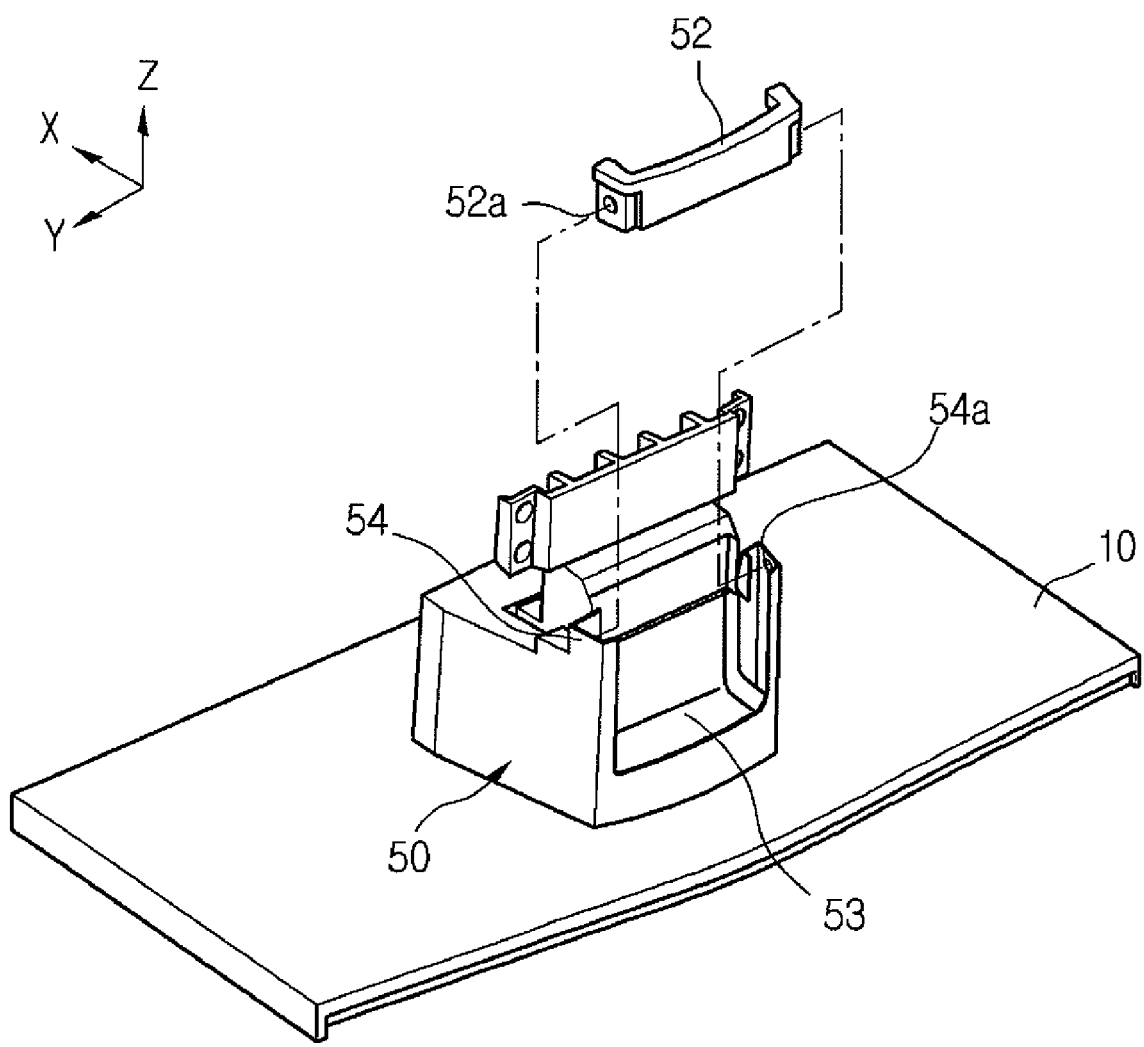
FIG. 2 is an exploded perspective view illustrating a stand body of a display apparatus according to an embodiment of the present invention.

A cable holder 52 collects the cables (C) connected to the main body 30. A cable holder 52 is mounted on a mounting portion 54 of the stand body 50 and can be detached from the stand body 50. Since the conventional cable holder 7 illustrated in FIG. 1 is rotatably coupled to the inner part of the stand base 10, an additional hinge is required. Therefore, it costs more and takes more time to manufacture the display apparatus. However, the cable holder 52 according to the present invention is inserted into the stand body 50. The cable holder 52 and the stand body 50 are simply formed by a plastic injection molding. Therefore, it costs less and takes less time in manufacturing the display device.

The mounting portion 54 may be formed in a rear (the reverse direction of the x-axis direction) and upper (the z-axis direction) portion of the stand body 50. Therefore, users attach the cable holder 52 to the stand body 50 and detach from the stand body 50 with ease. To arrange the cables (C), the conventional cable holder 7 illustrated in FIG. 1 is pulled out from behind and opened. Therefore, the stand body 50 should be generally rotated in order to arrange the cables (C) because of a wall closed behind the stand body 50. Since the cable holder 52 according to the present invention is pulled out upward from a top, the cable holder 52 can be easily attached and detached without rotating the stand body 50. The cables (C) are collected together in a receiving portion 53 by the mounting portion 54. The receiving portion 53 will be described in the below.

A protrusion 52a and a recess 54a may be used for the cable holder 52 to be firmly and detachably mounted to the stand base 10 and detached from the stand base 10. Although the protrusion 52a is formed at both ends (y-axis direction and the reverse direction of the y-axis direction) of the cable holder 52, and the recess 54a corresponding to the protrusion 52a is formed in the mounting portion 54 of the stand base 10 in this embodiment, the opposite is possible, too. In addition, the recess 54a may be a hole.

Just before the protrusion 52a is inserted into the recess 54a and just after the protrusion 52a is released from the recess 54a, elastic deformation may occur in at least one of the cable holder 52 and the mounting portion 54. For example, the cable holder 52 is bended or the mounting portion 54 of the stand body 50 is stretched outward by a user The cable holder 52 and the stand base 10 are firmly coupled to each other by the protrusion 52a and the recess 54a. In addition, the cable holder 52 can be easily attached to the stand base 10 and easily detached from the stand base 10 by the deformation. Therefore, the cables (C) can be quickly and easily arranged.

The stand body 50 and the cable holder 52 may be formed of plastics considering the elastic deformation and appearance unity using identical color and identical material.

The stand body 50 includes a portion facing the cable holder 52. The portion may include the receiving portion 53 receiving the cables (C). The mounting portion 54 defining receiving portion 53 covers the cables (C) at the side view (the y-axis direction or the reverse direction of the y-axis direction) so that the appearance is improved.

An upper hole 55 and a rear hole 56 are formed by the stand body 50 and the cable holder 52. The cables (C) may be arranged through the holes 50 and 52, respectively.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display apparatus comprising:
    a stand base;
    a stand body having a cable receiving portion recessed therein and a mounting portion opening upwardly at its upper end and being supported by the stand base;
    a main body displaying images and supported by the stand body;
    a cable holder collecting cables connected to the main body, the cable holder being detachably mounted to the mounting portion and adapted to be pulled out upwardly from an upper end of the mounting portion,
    wherein the cable holder is coupled to an inner part of the receiving portion while the cable holder is completely inserted into the mounting portion.

2. The display apparatus according to claim 1, wherein protrusions are formed on one of the cable holder and the mounting portion of the stand base, and corresponding recesses or holes are formed on the other.

3. The display apparatus according to claim 1, wherein the mounting portion is formed in a rear and upper portion of the stand body.

4. The display apparatus according to claim 1, wherein at least one of the cable holder and the mounting portion elastically deforms when the cable holder is attached to the mounting portion or detached from the mounting portion.

5. The display apparatus according to claim 1, wherein the receiving portion faces the cable holder.

6. The display apparatus according to claim 1, wherein the stand body and the cable holder define upper and rear holes through which the cables go.

7. The display apparatus according to claim 1, wherein the cable holder is linearly movable along a straight line in order to detach the cable holder from the mounting portion.

8. The display apparatus according to claim 1, wherein the cable holder is linearly movable along a generally vertical line in order to detach the cable holder from the mounting portion.

* * * * *